United States Patent
Lin et al.

(10) Patent No.: US 11,841,157 B2
(45) Date of Patent: Dec. 12, 2023

(54) CONTROL METHOD AND APPARATUS FOR CONTROLLER, AND STORAGE MEDIUM AND CONTROLLER

(71) Applicant: Gree Electric Appliances, Inc. of Zhuhai, Guangdong (CN)

(72) Inventors: Shengjie Lin, Guangdong (CN); Jianwen Wu, Guangdong (CN); Changhai Liao, Guangdong (CN); Shengshi Ye, Guangdong (CN); Zehan Tan, Guangdong (CN)

(73) Assignee: Gree Electric Appliances, Inc. of Zhuhai, Guangdong (CN)

(*) Notice: Subject to any disclaimer, the term of this patent is extended or adjusted under 35 U.S.C. 154(b) by 244 days.

(21) Appl. No.: 17/421,609

(22) PCT Filed: Oct. 25, 2019

(86) PCT No.: PCT/CN2019/113158
§ 371 (c)(1),
(2) Date: Jul. 8, 2021

(87) PCT Pub. No.: WO2020/192103
PCT Pub. Date: Oct. 1, 2020

(65) Prior Publication Data
US 2022/0074619 A1    Mar. 10, 2022

(30) Foreign Application Priority Data
Mar. 25, 2019 (CN) .......................... 201910227320.3

(51) Int. Cl.
*F24F 11/58* (2018.01)
*F24F 11/65* (2018.01)
(Continued)

(52) U.S. Cl.
CPC ............. *F24F 1/58* (2013.01); *F24F 11/65* (2018.01); *G05B 15/02* (2013.01)

(58) Field of Classification Search
CPC .. F24F 11/58; F24F 11/65; F24F 11/61; F24F 11/56; G05B 15/02; G05B 2219/2614
See application file for complete search history.

(56) References Cited

U.S. PATENT DOCUMENTS 9,839,849 B2 * 12/2017 Link .................. A63F 13/10
2011/0208355 A1 * 8/2011 Tsusaka .............. B25J 13/08
901/31
(Continued)

FOREIGN PATENT DOCUMENTS

| CN | 101706147 | 5/2010 |
| CN | 103312881 | 9/2013 |

(Continued)

OTHER PUBLICATIONS

CN Office Action in Chinese Appln. No. 201910227320.3, dated Jan. 6, 2020, 14 pages (with English Translation).
(Continued)

*Primary Examiner* — Ramesh B Patel
(74) *Attorney, Agent, or Firm* — Fish & Richardson P.C.

(57) ABSTRACT

A control method and an apparatus for a controller, and a storage medium and a controller. The control method comprises: determining the current state of the controller, the current state comprising a current top surface, and/or an action method based on the current top surface; determining, according to the preconfigured correspondences between set states and set control modes, a set control mode corresponding to a set state that is the same as the current state in the correspondences as a current control mode; and sending a control command of the current control mode to a target control device. The problem of a cumbersome operation in controlling the temperature and the humidity of an air (Continued)

conditioner by means of a remote-control unit can be solved, and the effect of improving the convenience in operation is achieved.

18 Claims, 4 Drawing Sheets

(51) Int. Cl.
   *G05B 15/02* (2006.01)
   *F24F 1/58* (2011.01)

(56) References Cited

U.S. PATENT DOCUMENTS

| | | | | |
|---|---|---|---|---|
| 2012/0173021 | A1* | 7/2012 | Tsusaka | B25J 13/08 |
| | | | | 901/46 |
| 2016/0359325 | A1* | 12/2016 | Kawata | H04L 12/2829 |
| 2018/0210434 | A1* | 7/2018 | Iwatake | G05B 19/423 |
| 2018/0298754 | A1* | 10/2018 | Kodaira | B63B 22/24 |
| 2020/0077576 | A1* | 3/2020 | Pickett | A01D 43/14 |
| 2021/0136694 | A1* | 5/2021 | Gao | H04W 52/245 |

FOREIGN PATENT DOCUMENTS

| | | |
|---|---|---|
| CN | 203869254 U | 10/2014 |
| CN | 106355852 | 1/2017 |
| CN | 106642570 | 5/2017 |
| CN | 107166660 | 9/2017 |
| CN | 107543293 | 1/2018 |
| CN | 107911919 | 4/2018 |
| CN | 109489201 | 3/2019 |
| CN | 109945411 | 6/2019 |
| CN | 110012530 | 7/2019 |
| DE | 202006019659 | 4/2007 |
| EP | 2463595 | 6/2012 |
| GB | 2453121 | 4/2009 |
| JP | 2015183964 | 10/2015 |

OTHER PUBLICATIONS

PCT International Preliminary Report on Patentability in International Appln. No. PCT/CN2019/113158, dated Sep. 28, 2021, 13 pages (with English Translation).

PCT International Search Report and Written Opinion in International Appl. No. PCT/CN2019/113158, dated Feb. 12, 2020, 19 pages (with English Translation).

* cited by examiner

CONTROL METHOD AND APPARATUS FOR CONTROLLER, AND STORAGE MEDIUM AND CONTROLLER

CROSS-REFERENCE TO RELATED APPLICATIONS

This application is a U.S. National Phase application under 35 U.S.C. § 371 of International Patent Application No. PCT/CN2019/113158, filed on Oct. 25, 2019, which claims priority to Chinese Patent Application No. 201910227320.3, filed on Mar. 25, 2019, the contents of which are incorporated herein by reference.

TECHNICAL FIELD

This disclosure relates to the technical field of remote control, and in particular relates to a control method and an apparatus for a controller, and a storage medium and a controller, and more particularly to a method and an apparatus for implementing control interaction modes of an intelligent controller, such as six modes in six-surface control mode, and a storage medium and a controller.

BACKGROUND

A traditional air conditioner controller is mainly composed of an integrated circuit board and buttons for generating different messages. It adopts infrared radio frequency technology to control the air conditioner, and it is a device that can remotely control the air conditioner. At present, the traditional remote control for air conditioner is very common in life, which brings certain convenience to the use of air conditioner. However, with the continuous development of today's technique and technology, in related technologies, the traditional remote control for air conditioner only meets people's control of the air conditioner, there are still problems such as fuzzy mode setting, cumbersome operation, inability to achieve one-button control, and no intelligent control.

For example, an existing remote control for the air conditioner is composed of an infrared receiving and transmitting circuit, a signal conditioning circuit, central controller 8031, a program and data memory, a keyboard, and a status indicating circuit. The existing remote control has as many as 10 to 20 buttons, with many buttons and complicated functions. For the elderly and children, one-button temperature control is required.

The above content is only used to assist the understanding of the technical solution of the disclosure, and does not mean to acknowledge that the above content is prior art.

SUMMARY

In view of the above defects, an objective of the present disclosure is to provide a control method and an apparatus for a controller, and a storage medium and a controller, so as to solve the problem of a cumbersome operation in controlling the temperature and humidity of the air conditioner through the remote controller, and achieve the effect of improving the convenience in operation.

The disclosure provides a control method for a controller, including: determining a current state of the controller, where the current state includes at least one of a current top surface and an action mode based on the current top surface; determining, based on preconfigured correspondences between set states and set control modes, a set control mode corresponding to a set state that is the same as the current state in the correspondences as a current control mode; and sending a control command for the current control mode to a target control device.

In an embodiment, determining a current state of the controller includes: acquiring velocity information of the controller, wherein the velocity information includes acceleration information and angular velocity information, the acceleration information is configured to determine the current top surface of the controller, and the angular velocity information is configured to recognize a rotation operation of the controller to determine the action mode of the controller based on the current top surface; and determining, based on correspondences between set velocities and set states, a set state corresponding to a set velocity that is the same as the velocity information in the correspondences, as the current state.

In an embodiment, acquiring velocity information of the controller includes at least one of the following steps: detecting the acceleration information of the controller by an acceleration sensor built in the controller; and detecting the angular velocity information of the controller by an angular velocity sensor built in the controller.

In an embodiment, the controller includes a top surface, a bottom surface, and side surfaces arranged between the top surface and the bottom surface. If the target control device is an air conditioner, the correspondences between set states and set control modes includes at least one of situations of: when the set state is that the current top surface of the controller is the top surface and the action mode based on the current top surface is clockwise rotation or counterclockwise rotation, the set control mode being a temperature control mode; when the set state is that the current top surface of the controller is one of the side surfaces, the set control mode being a preset mode that is configurable; and when the set state is that the current top surface of the controller is the bottom surface, the set control mode being a power on/off control mode.

In an embodiment, the number of side surfaces of the controller is at least three, if the target control device is an air conditioner, for the side surfaces of the controller, the preset mode that is configurable includes at least one of situations of: when the current top surface is a first side surface of at least three side surfaces of the controller, the preset mode being a custom mode, wherein, in the custom mode, the air conditioner recognizes heating or cooling based on an ambient temperature, and acquires at least one of a temperature, an air volume, and a fan sweep angle set based on a preset habit; when the current top surface is a second side surface of at least three side surfaces of the controller, the preset mode being a fast mode where the air conditioner operates at a set speed, wherein, in the fast mode, the air conditioner recognizes heating or cooling based on an ambient temperature, performs cooling operation or heating operation based on a target temperature at the set speed for a first preset duration, and then returns to the custom mode; when the current top surface is a third side surface of at least three side surfaces of the controller, the preset mode being a sleep mode, wherein, in the sleep mode, the air conditioner is turned off regularly or operates based on preset sleep parameters; and when the current top surface is a fourth side surface of at least three side surfaces of the controller, the preset mode being an automatic mode, wherein, in the automatic mode, an operating mode of the air conditioner is an automatic setting, a temperature and sleep are automatic settings, while fan speed level and fan sweep mode are adjustable settings.

In an embodiment, preconfiguring correspondences between set states and set control modes includes at least one of the following steps: receiving and storing, from a client, the configuration information of the control mode for each surface of the controller; and sending a control command for the current control mode to a target control device, including: upon determining that the controller is stationary in the current control mode for a second preset duration, sending the control command for the current control mode.

In an embodiment, the control method further including at least one of the following steps: waking up the controller based on a set wake-up logic; setting the controller to be in a set sleep state based on a set sleep logic; modifying the preconfigured correspondences between set states and set control modes; and performing a child lock function setting and/or an anti-lost function setting on the controller.

Corresponding to the above control method, in another aspect, the disclosure provides a control apparatus of a controller, including: a determination unit, configured to determine a current state of the controller, the current state including at least one of a current top surface and an action mode based on the current top surface; and a control unit, configured to determine, based on preconfigured correspondences between set states and set control modes, a set control mode corresponding to a set state that is the same as the current state in the correspondences as a current control mode; the control unit is further configured to send a control command for the current control mode to a target control device.

In an embodiment, in the aspect of determining a current state of the controller, the determination unit is configured to: acquire velocity information of the controller, wherein the velocity information includes acceleration information and angular velocity information, the acceleration information is configured to determine the current top surface of the controller, and the angular velocity information is configured to recognize a rotation operation of the controller to determine the action mode of the controller based on the current top surface; and determine, based on correspondences between set velocities and set states, a set state corresponding to a set velocity that is the same as the velocity information in the correspondences, as the current state.

In an embodiment, in the aspect of acquiring velocity information of the controller, the determination unit is configured to: detect the acceleration information of the controller by an acceleration sensor built in the controller; and/or detect the angular velocity information of the controller by an angular velocity sensor built in the controller.

In an embodiment, the controller includes a top surface, a bottom surface, and side surfaces arranged between the top surface and the bottom surface. If the target control device is an air conditioner, the control unit is configured to preconfigure the correspondences between set states and set control modes, including at least one of situations of: when the set state is that the current top surface of the controller is the top surface and the action mode based on the current top surface is clockwise rotation or counterclockwise rotation, the set control mode being a temperature control mode; when the set state is that the current top surface of the controller is one of the side surfaces, the set control mode being a preset mode that is configurable; and when the set state is that the current top surface of the controller is the bottom surface, the set control mode being a power on/off control mode.

In an embodiment, the number of side surfaces of the controller is at least three. If the target control device is an air conditioner, for the side surfaces of the controller, the preset mode configured by the control unit includes at least one of situations of: when the current top surface is a first side surface of at least three side surfaces of the controller, the preset mode being a custom mode, wherein, in the custom mode, the air conditioner recognizes heating or cooling based on an ambient temperature, and acquires at least one of a temperature, an air volume, and a fan sweep angle set based on a preset habit; when the current top surface is a second side surface of at least three side surfaces of the controller, the preset mode being a fast mode where the air conditioner operates at a set speed, wherein, in the fast mode, the air conditioner recognizes heating or cooling based on an ambient temperature, performs cooling operation or heating operation based on a target temperature at the set speed for a first preset duration, and then returns to the custom mode; when the current top surface is a third side surface of at least three side surfaces of the controller, the preset mode being a sleep mode, wherein, in the sleep mode, the air conditioner is turned off regularly or operates based on preset sleep parameters; and when the current top surface is a fourth side surface of at least three side surfaces of the controller, the preset mode being an automatic mode, wherein, in the automatic mode, an operating mode of the air conditioner is an automatic setting, a temperature and sleep are automatic settings, while fan speed level and fan sweep mode are adjustable settings.

In an embodiment, in the aspect of preconfiguring correspondences between set states and set control modes, the control unit is configured to: receive and store, from a client, the configuration information of the control mode for each surface of the controller; and/or send a control command for the current control mode to a target control device, including: upon determining that the controller is stationary in the current control mode for a second preset duration, sending the control command for the current control mode.

In an embodiment, the control unit is further configured to perform at least one of the following steps: waking up the controller based on a set wake-up logic; setting the controller to be in a set sleep state based on a set sleep logic; modifying the preconfigured correspondences between set states and set control modes; and performing a child lock function setting and/or an anti-lost function setting on the controller.

Corresponding to the above control apparatus, in a further aspect, the disclosure provides a controller, including the control apparatus for the controller mentioned above.

Corresponding to the above control method, in a yet further aspect, the disclosure provides a storage medium storing a plurality of instructions thereon, the plurality of instructions, when loaded and executed by a processor, are configured to implement the control method for the controller mentioned above.

Corresponding to the above control method, in a still further aspect, the disclosure provides a controller, including: a processor, configured to execute a plurality of instructions; a memory, configured to store a plurality of instructions. The plurality of instructions is configured to be stored by the memory, and loaded and executed by the processor to implement the control method for the controller mentioned above.

In the solution of the disclosure, by making each surface of the Cube controller correspond to an operation mode and controlling respective surfaces being facing up, the control of the temperature and humidity of the air conditioner can be realized in one step, which improves the convenience and efficiency of the control.

Further, in the solution of the disclosure, on the basis of the Air Cube controller, by performing the functional integration of the remote control for air conditioner and redefining the control of the remote control for air conditioner, the convenience of the control operation of the air conditioner is improved, thereby achieving good user experiences.

Further, in the solution of the disclosure, by adopting a design of six control modes for six surfaces of a hexahedron, the one-button mode control of the intelligent controller for Air Cube air conditioner is realized, which facilitates the control of the user on the air conditioner, and the operation process is simple and reliable.

Further, in the solution of the disclosure, by adopting the built-in acceleration and angular velocity modules to calculate and judge the different states for six surfaces of the hexahedral, the control of the air conditioner is recognized and realized with simple operation, the control efficiency and reliability are guaranteed, and the user experience is good.

Further, in the solution of the disclosure, by realizing the control of different modes of air conditioner with the six surfaces of the intelligent controller cube for the air conditioner, one-button operation of different temperatures, air volumes, wind speeds, and modes for the air conditioner can be realized with high operating efficiency, and the control has high reliability and accuracy.

Therefore, in the solution of the present disclosure, by configuring the operation mode of each surface of the Cube controller and controlling respective surfaces being facing up, the control of the temperature and humidity of the air conditioner can be realized in one step, which solves the problem of a cumbersome operation in controlling the temperature and humidity of the air conditioner through the remote controller. Therefore, the defects of cumbersome operation, inconvenient use and poor user experience in the prior art are overcome, and the beneficial effects of simple operation, convenient use and good user experience are achieved.

Other features and advantages of the disclosure will be described in the following specification, and will be obvious in part from the specification, or will be understood by implementing the disclosure.

The technical solutions of the disclosure are further described in detail below through the accompanying drawings and the embodiments.

The reference signs in the drawings and the embodiments of the disclosure are as follows: 102—determination unit; 104—control unit.

DETAILED DESCRIPTION

In order to make the objective, technical solutions, and advantages of the disclosure clearer, the technical solutions of the disclosure will be clearly and completely described below with reference to specific embodiments of the disclosure and the accompanying drawings. Obviously, the described embodiments are only some embodiments of the disclosure, rather than all embodiments. Based on the embodiments of the disclosure, all other embodiments obtained by those of ordinary skill in the art without paying a creative work shall fall within the protection scope of the disclosure.

Figure 1:
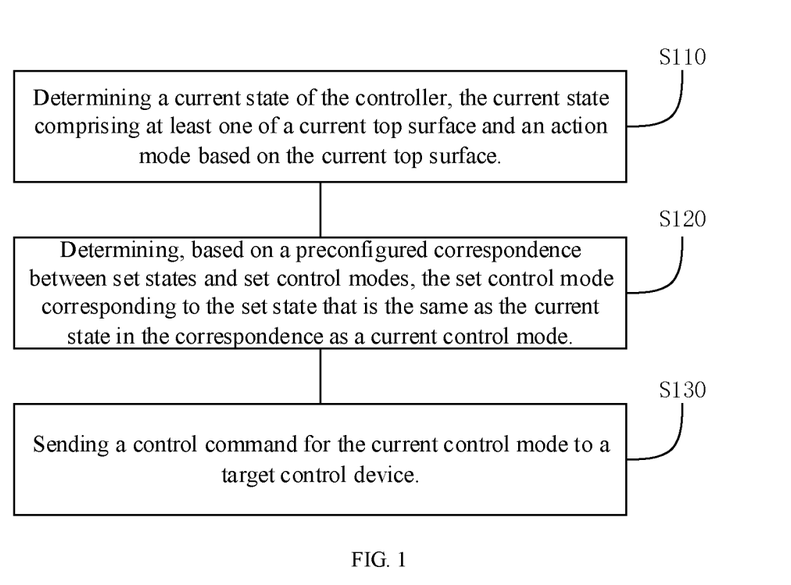
FIG. 1 is a schematic flowchart showing a control method for a controller according to an embodiment of the disclosure.

According to an embodiment of the disclosure, a control method for a controller is provided. As shown in FIG. 1, it illustrates a schematic flowchart showing the method according to an embodiment of the disclosure. The control method for the controller may include: steps S110 to S130.

Step S110: determining a current state of the controller. The current state may include: a current top surface, and/or an action mode based on the current top surface.

Figure 2:
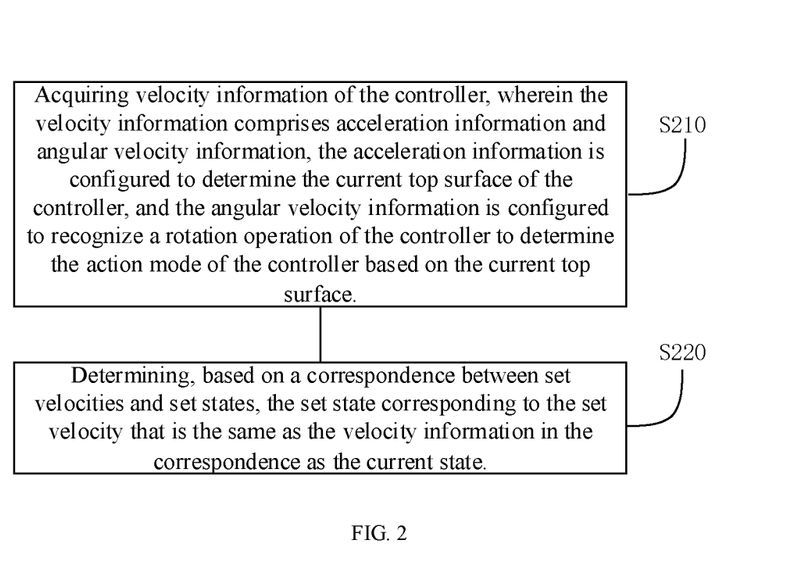
FIG. 2 is a schematic flowchart showing determining the current state of the controller in a method according to an embodiment of the disclosure.

In an embodiment, the specific process of determining the current state of the controller in step S110 can be further illustrated with reference to the schematic flowchart of determining the current state of the controller in a method according to an embodiment of the disclosure, as shown in FIG. 2, step S110 may include: steps S210 to S220.

Step S210: acquiring velocity information of the controller. The velocity information may include acceleration information and angular velocity information, the acceleration information may be configured to determine the current top surface of the controller, and the angular velocity information may be configured to recognize a rotation operation of the controller to determine the action mode of the controller based on the current top surface;

Furthermore, in an embodiment, the acquiring velocity information of the controller in step S210 may include at least one of the following acquisition methods.

The first acquisition method: detecting the acceleration information of the controller by an acceleration sensor built in the controller.

Furthermore, in an embodiment, the acceleration sensor may include a three-axis acceleration sensor and a gravity acceleration sensor, the three-axis acceleration sensor may be configured to acquire the acceleration of each axis, and the gravity acceleration sensor may be configured to acquire the gravitational acceleration. The acceleration information may include the magnitude and positive/negative situation of the difference between the acceleration of each axis and the gravitational acceleration.

Therefore, by determining the current top surface of the controller based on the magnitude and positive/negative situation of the difference between the acceleration of each axis and the gravitational acceleration, the determination method is accurate and reliable.

The second acquisition method: detecting the angular velocity information of the controller by an angular velocity sensor built in the controller.

Therefore, by acquiring velocity information of the controller in a variety of ways, the acquisition method is simple, and the acquired result is accurate and reliable.

Furthermore, in an embodiment, the angular velocity sensor may include a three-axis gyroscope sensor, and the three-axis gyroscope sensor may be configured to acquire the magnitude and positive/negative situation of the integral angle of the angular velocity of each axis.

For example, in order to realize the one-button mode control of the intelligent controller for Air Cube air conditioner, a design of six control modes for six surfaces of a hexahedron is adopted, and the built-in acceleration and angular velocity modules are adopted to calculate and judge the different states for six surfaces of the hexahedral, so as to recognize and realize the control of the air conditioner.

For example, the topped surface and rotation status of the differential velocity sensor and gyroscope sensor (which may belong to the components of the intelligent controller itself) built in the intelligent controller can be used to performing surface operation recognition and rotation operation recognition. For surface operation recognition: using a three-axis accelerometer, it can be judged by the magnitude and positive/negative situation of the difference between the acceleration of each axis and the gravitational acceleration. For rotation operation recognition: using a three-axis gyroscope, it can be judged by the magnitude and positive/negative situation of the integral angle of the angular velocity of each axis.

Therefore, by determining the action mode of the controller based on the current top surface based on the magnitude and positive/negative situation of the integral angle of the angular velocity of each axis, the determination of the action mode is accurate and reliable.

Step S220: determining, based on correspondences between set velocities and set states, a set state corresponding to a set velocity that is the same as the velocity information in the correspondences, as the current state.

Therefore, by determining the current state of the controller based on its acceleration information and angular velocity information, the determination method is simple and convenient, and the accuracy and reliability of the determination of the current state of the controller can be guaranteed.

Step S120: determining, based on preconfigured correspondences between set states and set control modes, a set control mode corresponding to a set state that is the same as the current state in the correspondences as a current control mode.

In an embodiment, in the correspondences between set states and set control modes, the set state includes a current top surface of the controller, and/or a rotation mode of the controller based on its current top surface; when the target control device is an air conditioner, the set control mode includes at least one of a temperature control mode, a power on/off control mode, and a configuration control mode.

Therefore, with the correspondences between various set states and various set control modes, the setting of the control modes of the controller is flexible and diverse, it is convenient for users with different needs.

Specifically, the controller may include a top surface, a bottom surface, and side surfaces arranged between the top surface and the bottom surface. For example, the controller may include a top surface, a bottom surface, and at least three side surfaces. The top surface and the bottom surface are arranged up and down, respectively, and the at least three side surfaces are arranged between the top surface and the bottom surface.

When the to-be-controlled device (such as the target control device) is an air conditioner, the preconfigured correspondences between set states and set control modes in step S120 may include at least one of the following correspondences.

The first correspondence: when the set state is that the current top surface of the controller is the top surface and the action mode based on the current top surface is clockwise rotation or counterclockwise rotation, the set control mode being a temperature control mode.

For example, when the set state is that the current top surface of the controller is the top surface and the action mode based on the current top surface is clockwise rotation, the set control mode is raising temperature.

For another example, when the set state is that the current top surface of the controller is the top surface, and the action mode based on the current top surface is counterclockwise rotation, the set control mode is lowering temperature.

The second correspondence: when the set state is that the current top surface of the controller is one of the side surfaces, the set control mode being a preset mode that is configurable.

The third correspondence: when the set state is that the current top surface of the controller is the bottom surface, the set control mode being a power on/off control mode. For example, when the set state is that the current top surface of the controller is the bottom surface, the control command for the set control mode is shutdown.

For example, when the top surface of the intelligent controller is facing up, the temperature can be raised or lowered by rotating it clockwise or counterclockwise. When it is flipped such that any one of the four side surfaces is facing up, a corresponding preset mode can be configured. When it is flipped such that the bottom surface is facing up, the air conditioner is turned off.

Therefore, when the target control device is an air conditioner, by preconfiguring the correspondences between various surfaces of the controller and control modes of the air conditioner, a simple and rapid control on the control mode of the air conditioner through the controller can be realized, making the user operation more convenient and reliable.

In an embodiment, the number of side surfaces of the controller is at least three.

When the target control device is an air conditioner, for the side surfaces of the controller, the preset modes that is configurable may include at least one of the following preset modes.

The first preset mode: when a first side surface of at least three side surfaces of the controller is facing up, the preset mode is a custom mode. In the custom mode, the air conditioner can recognize heating or cooling based on the ambient temperature, and acquire at least one of a temperature, an air volume, and a fan sweep angle set based on a preset habit. The preset habit may include user habit.

For example, the A surface of the intelligent controller may correspond to a custom mode, for example, the controller can automatically recognize cooling or heating based on the ambient temperature, and acquire the common temperature, air volume, and fan sweep angle for summer or winter set by the user.

The second preset mode: when a second side surface of at least three side surfaces of the controller is facing up, the preset mode is a fast mode where the air conditioner can operate at a set speed. In the fast mode, the air conditioner can recognize heating or cooling based on the ambient temperature, and perform cooling operation or heating operation based on a target temperature at the set speed for a first preset duration, and then return to the custom mode.

For example, the B surface of the intelligent controller may correspond to a fast mode, for example, the air conditioner can automatically recognize cooling or heating based on the ambient temperature, and perform rapid cooling operation or heating operation based on a specific set temperature. For example, the set temperature is set to be 20 degrees, make the room cool down quickly, and the air conditioner will return to the custom mode after a preset duration.

The third preset mode: when a third side surface of at least three side surfaces of the controller is facing up, the preset mode is a sleep mode. In the sleep mode, the air conditioner can be turned off regularly or operate based on preset sleep parameters.

For example, the C surface of the intelligent controller may correspond to a sleep mode, and the air conditioner can be configured to be in timing shutdown or sleep mode through APP.

The fourth preset mode: when a fourth side surface of at least three side surfaces of the controller is facing up, the preset mode is an automatic mode. In the automatic mode, the operation mode of the air conditioner is set to be an automatic setting, the temperature and sleep are set to be automatic settings, while the fan speed level and fan sweep mode are set to be adjustable settings.

For example, the D surface of the intelligent controller may correspond to an automatic mode, and the operations that can be performed on the air conditioner in the automatic mode may include: operation mode of the air conditioner being set to be automatic, the temperature and sleep being set to be non-adjustable, and the fan speed level (except super strong), up and down fan sweep, left and right fan sweep, and timing being set to be adjustable. For example, the adjustable preset value in an automatic mode may include: the fan speed level being automatic, opening the up and down fan sweep, opening the left and right fan sweep, turning the timing off, and turning the sleep off.

Therefore, when the target control device is an air conditioner, by preconfiguring the correspondence between each side surface of the controller and the specific control mode of the air conditioner, the specific control mode of the air conditioner can be switched from one to anther flexibly and conveniently by setting each side surface of the controller being facing up, which is reliable and convenient.

In an embodiment, preconfiguring correspondences between set states and set control modes in step S120 may include: receiving and storing, from a client, the configuration information of the control mode for each surface of the controller.

For example, the control of custom function of the intelligent controller for the air conditioner can be realized by connecting it to a mobile phone APP.

Therefore, by receiving and storing, from a client, the configuration information of the control mode for each surface of the controller, the correspondence between the set state of each surface of the controller and the set control mode is preconfigured, which is convenient for users to flexibly configure according to actual needs, and the user experience is good.

Step S130: sending a control command for the current control mode to a target control device For example, the intelligent controller for the air conditioner, such as a hexahedron-shaped controller, can be realized through an Air Cube (such as a Cube controller). Each surface corresponds to an operation mode, by controlling respective surfaces being facing up, the control of the temperature and humidity of the air conditioner can be realized in one step. In this way, on the basis of the Air Cube controller, the functional integration of the remote control for air conditioner can be realized, and the control of the remote control for air conditioner can be redefined. For example, One-button operation of different temperatures, air volumes, wind speeds, and modes for the air conditioner can be realized.

Therefore, by determining the current control mode based on the current state of the controller, and then sending the control command for the current control mode to the target control device, the control on the target control device is realized, the operation is simple and of high reliability.

In an embodiment, the sending a control command for the current control mode to a target control device in step S130 may include: upon determining that the controller is stationary in the current control mode for a second preset duration, sending the control command for the current control mode.

For example, the control of different modes of air conditioner can be realized with the six surfaces of the intelligent controller cube for the air conditioner; further, the acceleration and angular velocity can be used to calculate and judge the state, recognize and realize the control of the air conditioner, and the control can be initiated after 1 to 2 seconds of static confirmation.

Therefore, by sending the control command for the current control mode after the controller is stationary in the current control mode for a second preset duration, the misoperation rate can be reduced, the reliability and accuracy of the control can be improved, and the user experience can be improved.

In an optional embodiment, the control method may further include at least one of the following control operations.

Figure 5:
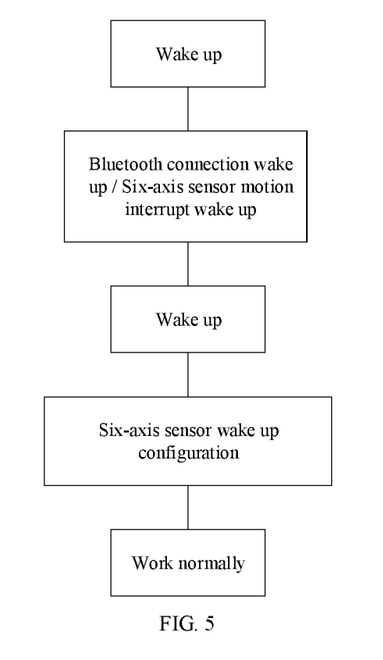
FIG. 5 is a schematic flowchart showing the wake-up logic of a controller according to an embodiment of the disclosure.

The first control operation: waking up the controller based on a set wake-up logic before the current state of the controller is determined, such that the controller is switched from a set sleep state to an operating state, for example, as shown in FIG. 5.

Therefore, by waking up the controller, the controller can be awakened when the controller is needed, and the controller can be used to control the target control device only after being waking up, which avoids misoperation, and improves the reliability and accuracy of using the controller to control the device.

Figure 6:
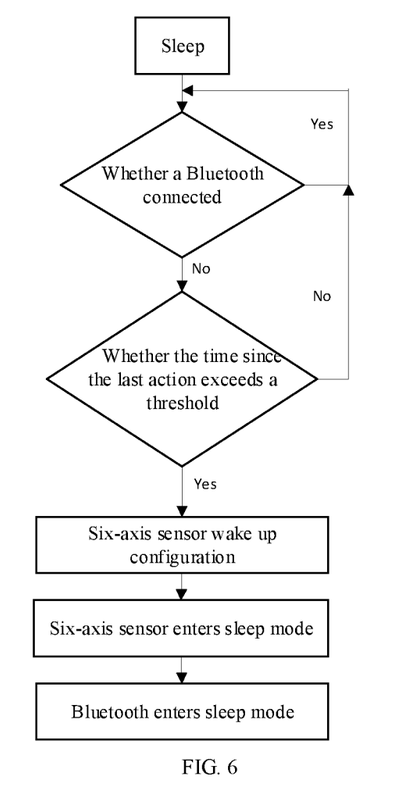
FIG. 6 is a schematic flowchart showing the sleep logic of a controller according to an embodiment of the disclosure.

The second control operation: setting the controller to be in a set sleep state based on a set sleep logic after the control command for the current control mode is sent to the target control device, so as to save power, for example, as shown in the FIG. 6.

Therefore, by setting the controller to be in a sleep state when the controller is not needed, power is saved, and misoperation can also be avoided.

Figure 7:
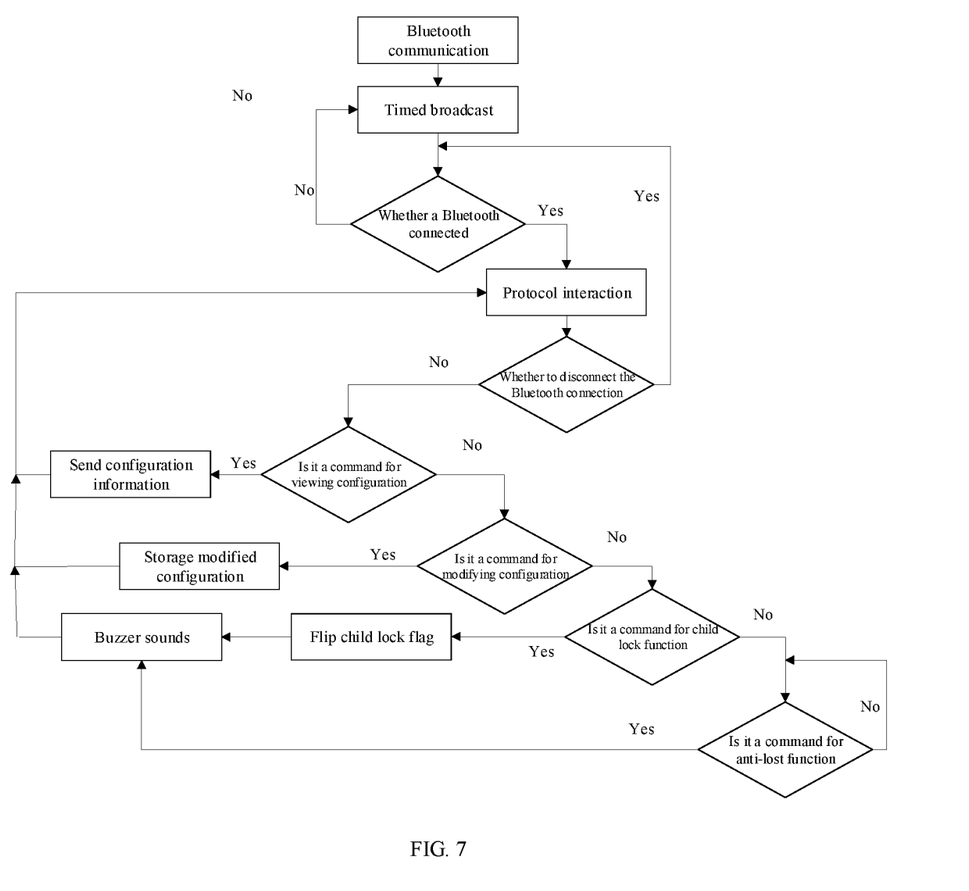
FIG. 7 is a schematic flowchart showing configuring the six-surface function of the intelligent controller according to an embodiment of the disclosure through a mobile phone.

The third control operation: modifying, according to the user's requirements, the preconfigured correspondences between set states and set control modes, for example, as shown in FIG. 7.

Therefore, by configuring and modifying the control mode for each surface, the control method can be applied to multiple control situations with multiple control requirements, and the flexibility and convenience of usage are better.

The fourth control operation: performing a child lock function setting and/or an anti-lost function setting on the controller according to the user's requirements, for example, as shown in FIG. 7.

For example, the child lock function can be set such that the controller does not work when the child lock function is turned on, and the controller can only work when the child lock function is turned off.

For example, the anti-lost function can be set by means of identity authentication, if the anti-lost function is turned on, an identity authentication is needed when using the controller, so as to avoid the insecurity that the controller can still be used for control after it is lost.

Therefore, the safety and reliability of the controller can be further improved by setting various functions such as child lock function and anti-lost function.

A large number of tests proves that, in the technical solution of this embodiment, by making each surface of the Cube controller correspond to an operation mode and controlling respective surfaces being facing up, the control of the temperature and humidity of the air conditioner can be realized in one step, which improves the convenience and efficiency of the control.

Figure 3:
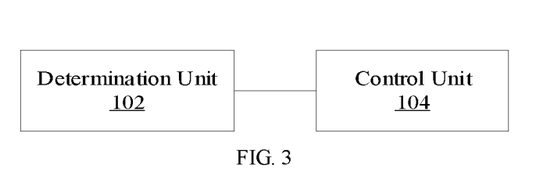
FIG. 3 is a schematic diagram showing the structure of a control apparatus for a controller according to an embodiment of the disclosure.

According to an embodiment of the disclosure, a control apparatus for a controller corresponding to the control method for the controller is further provided. FIG. 3 illustrates a schematic diagram of the structure of a control apparatus for a controller according to an embodiment of the disclosure. The control apparatus for the controller may include a determination unit 102 and a control unit 104.

In an optional example, the determination unit 102 may be configured to determine a current state of the controller. The current state may include: a current top surface, and/or an action mode based on the current top surface. For specific functions and processing of the determination unit 102, see step S110.

In an embodiment, in the aspect of determining a current state of the controller, the determination unit 102 may be specifically configured to acquire velocity information of the controller. The velocity information may include acceleration information and angular velocity information, the acceleration information may be configured to determine the current top surface of the controller, and the angular velocity information may be configured to recognize a rotation operation of the controller to determine the action mode of the controller based on the current top surface. For the specific functions and processing of the determination unit 102, see step S210.

In an embodiment, the determination unit 102 may acquire velocity information of the controller by at least one of the following acquisition methods.

In the first acquisition method, the determination unit 102 may be specifically configured to detect the acceleration information of the controller by an acceleration sensor built in the controller.

In an embodiment, the acceleration sensor may include a three-axis acceleration sensor and a gravity acceleration sensor, the three-axis acceleration sensor may be configured to acquire the acceleration of each axis, and the gravity acceleration sensor may be configured to acquire the gravitational acceleration. The acceleration information may include the magnitude and positive/negative situation of the difference between the acceleration of each axis and the gravitational acceleration.

Therefore, by determining the current top surface of the controller based on the magnitude and positive/negative situation of the difference between the acceleration of each axis and the gravitational acceleration, the determination method is accurate and reliable.

In the second acquisition method, the determination unit 102 may be specifically configured to detect the angular velocity information of the controller by an angular velocity sensor built in the controller.

Therefore, by acquiring velocity information of the controller in a variety of ways, the acquisition method is simple, and the acquired result is accurate and reliable.

Furthermore, in an embodiment, the angular velocity sensor may include a three-axis gyroscope sensor, and the three-axis gyroscope sensor may be configured to acquire the magnitude and positive/negative situation of the integral angle of the angular velocity of each axis.

For example, in order to realize the one-button mode control of the intelligent controller for Air Cube air conditioner, a design of six control modes for six surfaces of a hexahedron is adopted, and the built-in acceleration and angular velocity modules are adopted to calculate and judge the different states for six surfaces of the hexahedral, so as to recognize and realize the control of the air conditioner.

For example, the topped surface and rotation status of the differential velocity sensor and gyroscope sensor (which may belong to the components of the intelligent controller itself) built in the intelligent controller can be used to performing surface operation recognition and rotation operation recognition. For surface operation recognition: using a three-axis accelerometer, it can be judged by the magnitude and positive/negative situation of the difference between the acceleration of each axis and the gravitational acceleration. For rotation operation recognition: using a three-axis gyroscope, it can be judged by the magnitude and positive/negative situation of the integral angle of the angular velocity of each axis.

Therefore, by determining the action mode of the controller based on the current top surface based on the magnitude and positive/negative situation of the integral angle of the angular velocity of each axis, the determination of the action mode is accurate and reliable.

The determination unit 102 may be specifically configured to determine, based on correspondences between set velocities and set states, a set state corresponding to a set velocity that is the same as the velocity information in the correspondences, as the current state. For the specific functions and processing of the determination unit 102, see step S220.

Therefore, by determining the current state of the controller based on its acceleration information and angular velocity information, the determination method is simple and convenient, and the accuracy and reliability of the determination of the current state of the controller can be guaranteed.

In an optional example, the control unit 104 may be configured to determine, based on preconfigured correspondences between set states and set control modes, a set control mode corresponding to a set state that is the same as the current state in the correspondences as a current control mode. For specific functions and processing of the control unit 104, see step S120.

In an embodiment, in the correspondences between set states and set control modes, the set state includes a current top surface of the controller, and/or a rotation mode of the controller based on its current top surface; when the target control device is an air conditioner, the set control mode includes at least one of a temperature control mode, a power on/off control mode, and a configuration control mode.

Therefore, with the correspondences between various set states and various set control modes, the setting of the control modes of the controller is flexible and diverse, it is convenient for users with different needs.

Specifically, the controller may include a top surface, a bottom surface, and side surfaces arranged between the top surface and the bottom surface. For example, the controller may include a top surface, a bottom surface, and at least three side surfaces. The top surface and the bottom surface are arranged up and down, respectively, and the at least three side surfaces are arranged between the top surface and the bottom surface.

When the target control device is an air conditioner, the control unit 104 is configured to preconfigure the correspondences between set states and set control modes, including at least one of the following correspondences.

The first correspondence: when the set state is that the current top surface of the controller is the top surface and the action mode based on the current top surface is clockwise rotation or counterclockwise rotation, the set control mode being a temperature control mode.

For example, when the set state is that the current top surface of the controller is the top surface and the action mode based on the current top surface is clockwise rotation, the set control mode is raising temperature.

For another example, when the set state is that the current top surface of the controller is the top surface, and the action mode based on the current top surface is counterclockwise rotation, the set control mode is lowering temperature.

The second correspondence: when the set state is that the current top surface of the controller is one of the side surfaces, the set control mode being a preset mode that is configurable.

The third correspondence: when the set state is that the current top surface of the controller is the bottom surface, the set control mode being a power on/off control mode. For example, when the set state is that the current top surface of the controller is the bottom surface, the control command for the set control mode is shutdown.

For example, when the top surface of the intelligent controller is facing up, the temperature can be raised or lowered by rotating it clockwise or counterclockwise. When it is flipped such that any one of the four side surfaces is facing up, a corresponding preset mode can be configured. When it is flipped such that the bottom surface is facing up, the air conditioner is turned off.

Therefore, when the target control device is an air conditioner, by preconfiguring the correspondences between various surfaces of the controller and control modes of the air conditioner, a simple and rapid control on the control mode of the air conditioner through the controller can be realized, making the user operation more convenient and reliable.

In an embodiment, the number of side surfaces of the controller is at least three.

When the target control device is an air conditioner, for the side surfaces of the controller, the preset mode configured by the control unit 104 includes at least one of the following preset modes.

The first preset mode: when a first side surface of at least three side surfaces of the controller is facing up, the preset mode is a custom mode. In the custom mode, the air conditioner can recognize heating or cooling based on the ambient temperature, and acquire at least one of a temperature, an air volume, and a fan sweep angle set based on a preset habit. The preset habit may include user habit.

For example, the A surface of the intelligent controller may correspond to a custom mode, for example, the controller can automatically recognize cooling or heating based on the ambient temperature, and acquire the common temperature, air volume, and fan sweep angle for summer or winter set by the user.

The second preset mode: when a second side surface of at least three side surfaces of the controller is facing up, the preset mode is a fast mode where the air conditioner can operate at a set speed. In the fast mode, the air conditioner can recognize heating or cooling based on the ambient temperature, and perform cooling operation or heating operation based on a target temperature at the set speed for a first preset duration, and then return to the custom mode.

For example, the B surface of the intelligent controller may correspond to a fast mode, for example, the air conditioner can automatically recognize cooling or heating based on the ambient temperature, and perform rapid cooling operation or heating operation based on a specific set temperature. For example, the set temperature is set to be 20 degrees, make the room cool down quickly, and the air conditioner will return to the custom mode after a preset duration.

The third preset mode: when a third side surface of at least three side surfaces of the controller is facing up, the preset mode is a sleep mode. In the sleep mode, the air conditioner can be turned off regularly or operate based on preset sleep parameters.

For example, the C surface of the intelligent controller may correspond to a sleep mode, and the air conditioner can be configured to be in timing shutdown or sleep mode through APP.

The fourth preset mode: when a fourth side surface of at least three side surfaces of the controller is facing up, the preset mode is an automatic mode. In the automatic mode, the operation mode of the air conditioner is set to be an automatic setting, the temperature and sleep are set to be automatic settings, while the fan speed level and fan sweep mode are set to be adjustable settings.

For example, the D surface of the intelligent controller may correspond to an automatic mode, and the operations that can be performed on the air conditioner in the automatic mode may include: operation mode of the air conditioner being set to be automatic, the temperature and sleep being set to be non-adjustable, and the fan speed level (except super strong), up and down fan sweep, left and right fan sweep, and timing being set to be adjustable. For example, the adjustable preset value in an automatic mode may include: the fan speed level being automatic, opening the up and down fan sweep, opening the left and right fan sweep, turning the timing off, and turning the sleep off.

Therefore, when the target control device is an air conditioner, by preconfiguring the correspondence between each side surface of the controller and the specific control mode of the air conditioner, the specific control mode of the air conditioner can be switched from one to anther flexibly and conveniently by setting each side surface of the controller being facing up, which is reliable and convenient.

In an embodiment, in the aspect of preconfiguring correspondences between set states and set control modes, the control unit 104 is specifically configured to: receive and store, from a client, the configuration information of the control mode for each surface of the controller.

For example, the control of custom function of the intelligent controller for the air conditioner can be realized by connecting it to a mobile phone APP.

Therefore, by receiving and storing, from a client, the configuration information of the control mode for each surface of the controller, the correspondence between the set state of each surface of the controller and the set control mode is preconfigured, which is convenient for users to flexibly configure according to actual needs, and the user experience is good.

In an optional example, the control unit 104 may be configured to send a control command for the current control mode to a target control device. For specific functions and processing of the control unit 104, see step S130.

For example, the intelligent controller for the air conditioner, such as a hexahedron-shaped controller, can be realized through an Air Cube (such as a Cube controller). Each surface corresponds to an operation mode, by controlling respective surfaces being facing up, the control of the temperature and humidity of the air conditioner can be realized in one step. In this way, on the basis of the Air Cube controller, the functional integration of the remote control for air conditioner can be realized, and the control of the remote control for air conditioner can be redefined. For example, One-button operation of different temperatures, air volumes, wind speeds, and modes for the air conditioner can be realized.

Therefore, by determining the current control mode based on the current state of the controller, and then sending the control command for the current control mode to the target control device, the control on the target control device is realized, the operation is simple and of high reliability.

In an embodiment, in the aspect of sending a control command for the current control mode to a target control device, the control unit 104 may specifically be configured to send the control command for the current control mode, upon determining that the controller is stationary in the current control mode for a second preset duration.

For example, the control of different modes of air conditioner can be realized with the six surfaces of the intelligent controller cube for the air conditioner; further, the acceleration and angular velocity can be used to calculate and judge the state, recognize and realize the control of the air conditioner, and the control can be initiated after 1 to 2 seconds of static confirmation.

Therefore, by sending the control command for the current control mode after the controller is stationary in the current control mode for a second preset duration, the misoperation rate can be reduced, the reliability and accuracy of the control can be improved, and the user experience can be improved.

In an optional embodiment, at least one of the following control operations may further be included.

In the first control operation, the control unit 104 may be configured to wake up the controller based on a set wake-up logic before the current state of the controller is determined, such that the controller is switched from a set sleep state to an operating state, for example, as shown in FIG. 5.

Therefore, by waking up the controller, the controller can be awakened when the controller is needed, and the controller can be used to control the target control device only after being waking up, which avoids misoperation, and improves the reliability and accuracy of using the controller to control the device.

In the second control operation, the control unit 104 may be configured to set the controller to be in a set sleep state based on a set sleep logic after the control command for the current control mode is sent to the target control device, so as to save power, for example, as shown in the FIG. 6.

Therefore, by setting the controller to be in a sleep state when the controller is not needed, power is saved, and misoperation can also be avoided.

In the third control operation, the control unit 104 may be configured to modify the preconfigured correspondences between set states and set control modes according to the user's requirements, for example, as shown in FIG. 7.

Therefore, by configuring and modifying the control mode for each surface, the control method can be applied to multiple control situations with multiple control requirements, and the flexibility and convenience of usage are better.

In the fourth control operation, the control unit 104 may be configured to perform a child lock function setting and/or an anti-lost function setting on the controller according to the user's requirements, for example, as shown in FIG. 7.

For example, the child lock function can be set such that the controller does not work when the child lock function is turned on, and the controller can only work when the child lock function is turned off.

For example, the anti-lost function can be set by means of identity authentication, if the anti-lost function is turned on, an identity authentication is needed when using the controller, so as to avoid the insecurity that the controller can still be used for control after it is lost.

Therefore, the safety and reliability of the controller can be further improved by setting various functions such as child lock function and anti-lost function.

Since the processing and functions implemented by the apparatus of this embodiment are basically corresponding to the embodiments, principles, and examples of the methods shown in FIGS. 1-2, more details of the description of this embodiment can be referred to the relevant descriptions in the foregoing embodiments, which will not be repeated here.

A large number of tests proves that, in the technical solution of this embodiment, on the basis of the Air Cube controller, by performing the functional integration of the remote control for air conditioner and redefining the control of the remote control for air conditioner, the convenience of the control operation of the air conditioner is improved, thereby achieving good user experiences.

According to an embodiment of the disclosure, a controller corresponding to the control apparatus for the controller is further provided. The controller may include the control apparatus for the controller mentioned above.

In an optional embodiment, in the technical solution of this embodiment, the intelligent controller for the air conditioner, such as a hexahedron-shaped controller, can be realized through an Air Cube (such as a Cube controller). Each surface corresponds to an operation mode, by controlling respective surfaces being facing up, the control of the temperature and humidity of the air conditioner can be realized in one step. In this way, on the basis of the Air Cube controller, the functional integration of the remote controller for air conditioner is realized, and the control of the remote control for air conditioner is redefined.

In an optional example, in the solution of the disclosure, in order to realize the one-button mode control of the intelligent controller for Air Cube air conditioner, a design of six control modes for six surfaces of a hexahedron is adopted, and the built-in acceleration and angular velocity modules are adopted to calculate and judge the different states for six surfaces of the hexahedral, so as to recognize and realize the control of the air conditioner.

In solution of the disclosure, an intelligent controller for air conditioner may be provided to realize one-button operation of different temperatures, air volumes, wind speeds, and modes for the air conditioner. Therefore, the control of different modes of air conditioner can be realized with the six surfaces of the intelligent controller cube for the air conditioner; further, the acceleration and angular velocity can be used to calculate and judge the state, recognize and realize the control of the air conditioner, and the control can be initiated after 1 to 2 seconds of static confirmation.

In an optional example, in the solution of the disclosure, the intelligent controller for air conditioner simultaneously emits infrared rays from six surfaces in six directions to realize the control of the air conditioner. Therefore, the control of the air conditioner can be realized in one step, thereby simplifying the control steps of the traditional controller for the air conditioner to the air conditioner.

In an embodiment, the control of custom function of the intelligent controller for the air conditioner can be realized by connecting it to a mobile phone APP.

In an optional specific implementation manner, the specific implementation process of the solution of the disclosure is illustrated with reference to the examples shown in FIGS. 4-7.

Figure 4:
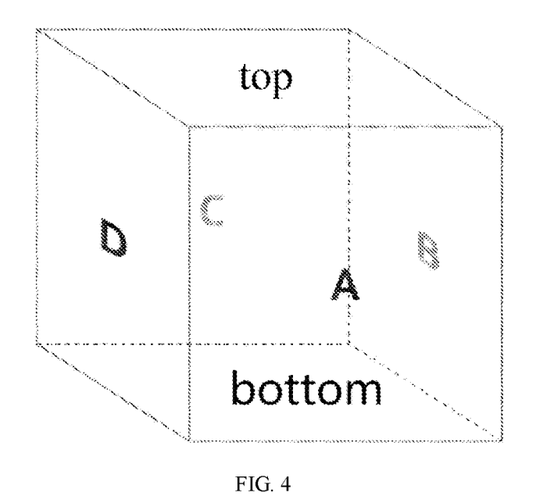
FIG. 4 is a schematic diagram showing the structure of the Cube controller according to the controller of the disclosure.

In an optional specific example, an example of the intelligent controller provided by the solution of the disclosure is shown in FIG. 4. The control mode for each surface of the intelligent controller shown in FIG. 4 can be referred to the following description.

The A surface of the intelligent controller may correspond to a custom mode, for example, the controller can automatically recognize cooling or heating based on the ambient temperature, and acquire the common temperature, air volume, and fan sweep angle for summer or winter set by the user.

The B surface of the intelligent controller may correspond to a fast mode, for example, the air conditioner can automatically recognize cooling or heating based on the ambient temperature, and perform rapid cooling operation or heating operation based on a specific set temperature. For example, the set temperature is set to be 20 degrees, make the room cool down quickly, and the air conditioner will return to the custom mode after a preset duration.

The C surface of the intelligent controller may correspond to a sleep mode, the air conditioner can be configured to be in timing shutdown or sleep mode through APP.

The D surface of the intelligent controller may correspond to an automatic mode, and the operations that can be performed on the air conditioner in the automatic mode may include: operation mode of the air conditioner being set to be automatic, the temperature and sleep being set to be non-adjustable, and the fan speed level (except super strong), up and down fan sweep, left and right fan sweep, and timing being set to be adjustable. For example, the adjustable preset value in an automatic mode may include: the fan speed level being automatic, opening the up and down fan sweep, opening the left and right fan sweep, turning the timing off, and turning the sleep off.

The top surface of the intelligent controller: the top surface can be rotated to adjust the temperature.

The bottom surface of the intelligent controller: shutdown.

In an optional specific example, the preparation for the implementation of the solution of the disclosure may include: connecting the software of the intelligent controller via Bluetooth or WIFI to configure control modes, and configuring a custom control mode for each surface of the intelligent controller (or directly selecting the factory configuration). In the software interface of the mobile controller, after clicking Add Intelligent controller, it automatically scans the surrounding Bluetooth devices, filters other Bluetooth devices within the scanning range according to Bluetooth name, etc., and only display the intelligent controller for the user to choose. After the user selects it, add it to the home page. On the home page, the user can customize the temperature and wind speed for each surface of the intelligent controller, and the user can also configure the wind speed, air volume, and temperature for each preset mode of the intelligent controller in detail.

The implementation of the control of the intelligent controller to the air conditioner mainly depends on WIFI communication (for example, the intelligent controller communicates with the WIFI air conditioner) and the infrared remote control (for example, the intelligent controller remotely controls the common air conditioner through infrared waves). The topped surface and rotation status of the differential velocity sensor and gyroscope sensor (which may belong to the components of the intelligent controller itself) built in the intelligent controller can be used to performing surface operation recognition and rotation operation recognition. For surface operation recognition: using a three-axis accelerometer, it can be judged by the magnitude and positive/negative situation of the difference between the acceleration of each axis and the gravitational acceleration. For rotation operation recognition: using a three-axis gyroscope, it can be judged by the magnitude and positive/negative situation of the integral angle of the angular velocity of each axis. When the top surface of the intelligent controller is facing up, the temperature can be raised or lowered by rotating it clockwise or counterclockwise. When it is flipped such that any one of the four side surfaces is facing up, a corresponding preset mode can be configured. When it is flipped such that the bottom surface is facing up, the air conditioner is turned off.

The intelligent controller uses two AAA alkaline primary batteries for power supply. The battery capacity is different for different discharge currents. It is estimated that one battery has a capacity of 800-1200 mAh, and two batteries have a capacity of 1600-2400 mAh. The standby time is about 6 months. According to the statistics of the usage time of the air conditioner during peak season (from June to September), the actual usage time of the intelligent controller is about 50 days.

In an embodiment, the wake-up logic of the intelligent controller is shown in FIG. 5, and the sleep logic of the intelligent controller is shown in FIG. 6. The intelligent controller can set the air conditioner to an ideal state through simple operation configurations such as flipping or rotating, which can simplify the operation of the remote control for the air conditioner.

In an alternative specific example, the intelligent controller can be configured through the mobile phone APP, so as to realize the operation of the intelligent controller by the mobile phone, thereby realizing the intelligent control on the air conditioner by the mobile phone.

Since the processing and functions implemented by the controller of this embodiment are basically corresponding to the embodiments, principles, and examples of the apparatus shown in FIG. 3, more details of the description of this embodiment can be referred to the relevant descriptions in the foregoing embodiments, which will not be repeated here.

A large number of tests proves that, in the technical solution of this embodiment, by adopting a design of six control modes for six surfaces of a hexahedron, the one-button mode control of the intelligent controller for Air Cube air conditioner is realized, which facilitates the control of the user on the air conditioner, and the operation process is simple and reliable.

According to an embodiment of the disclosure, a storage medium corresponding to the control method for the controller is further provided. The storage medium stores a plurality of instructions thereon, the plurality of instructions, when loaded and executed by a processor, are configured to implement the control method for the controller mentioned above.

Since the processing and functions implemented by the storage medium of this embodiment are basically corresponding to the embodiments, principles, and examples of the methods shown in FIGS. 1-2, more details of the description of this embodiment can be referred to the relevant descriptions in the foregoing embodiments, which will not be repeated here.

A large number of tests proves that, in the solution of the disclosure, by adopting the built-in acceleration and angular velocity modules to calculate and judge the different states for six surfaces of the hexahedral, the control of the air conditioner is recognized and realized with simple operation, the control efficiency and reliability are guaranteed, and the user experience is good.

According to an embodiment of the disclosure, a controller corresponding to the control method for the controller is further provided. The controller may include: a processor, configured to execute a plurality of instructions; a memory, configured to store a plurality of instructions. The plurality of instructions is configured to be stored by the memory, and loaded and executed by the processor to implement the control method for the controller mentioned above.

Since the processing and functions implemented by the controller of this embodiment are basically corresponding to the embodiments, principles, and examples of the methods shown in FIGS. 1-2, more details of the description of this embodiment can be referred to the relevant descriptions in the foregoing embodiments, which will not be repeated here.

A large number of tests proves that, in the technical solution of this embodiment, by realizing the control of different modes of air conditioner with the six surfaces of the intelligent controller cube for the air conditioner, one-button operation of different temperatures, air volumes, wind speeds, and modes for the air conditioner can be realized with high operating efficiency, and the control has high reliability and accuracy.

In summary, it is obvious for those of ordinary skill in the art that the above advantageous embodiments can be freely combined and superimposed on the premise of no conflict.

The above descriptions are only exemplary embodiments of the application, and are not intended to limit the application. For those of ordinary skill in the art, the application may have various modifications and variations, and any modification, equivalent replacement, and improvement made within the spirit and principle of the disclosure shall be included in the protection scope of the claims of the application.

The invention claimed is:

1. A method comprising:
   determining, using one or more processors, a current state of a controller for controlling an operation of a target control device, wherein the controller comprises a plurality of surfaces, and wherein determining the current state of the controller comprises determining that a first surface of the plurality of surfaces is facing upward;
   determining, using the one or more processors, and based on configuration information of the controller, that the first surface of the controller is associated with a first action mode of the controller;
   generating, using the one or more processors, one or more first control commands associated with the first action mode; and
   causing, by one or more processors, the one or more first control commands to be transmitted to the target control device.

2. The method of claim 1, wherein the current state of the controller is determined based on at least one of acceleration information or angular velocity information updated from one or more sensors of the controller.

3. The method of claim 2, further comprising determining that the first surface of the plurality of surfaces is facing upward based on the acceleration information.

4. The method of claim 2, further comprising determining the one or more first control commands based on the angular velocity information.

5. The method of claim 1, wherein determining the current state of the controller comprises determining that a second surface of the plurality of surfaces is facing upward, and
   wherein the method further comprises:
      determining, using the one or more processors, and based on the configuration information of the controller, that the second surface of the controller is associated with a second action mode of the controller;
      generating, using the one or more processors, one or more second control commands associated with the second action mode; and
      causing, by one or more processors, the one or more second control commands to be transmitted to the target control device.

6. The method of claim 1, wherein the target control device comprises an air conditioner,
   wherein the first action mode comprises a temperature change mode, and
   wherein the one or more first control commands comprise instructions to change a temperature setting of the air conditioner.

7. The method of claim 6, further comprising determining a direction of rotation of the controller, and
   wherein the one or more first control commands are generated based on the direction of rotation of the controller.

8. The method of claim 7, further comprising determining that the direction of rotation of the controller is a first direction, and
   wherein the one or more first control commands comprise instructions to increase the temperature setting of the air conditioner.

9. The method of claim 8, further comprising determining that the direction of rotation of the controller is a second direction opposite the first direction, and
   wherein the one or more first control commands comprise instructions to decrease the temperature setting of the air conditioner.

10. The method of claim 1, wherein the target control device comprises an air conditioner,
    wherein the first action mode comprises a power change mode, and
    wherein the one or more first control commands comprise instructions to change a power setting of the air conditioner.

11. The method of claim 1, wherein the target control device comprises an air conditioner,
    wherein the first action mode comprises a preset mode, and
    wherein the one or more first control commands comprise instructions to change an operation of the power setting to the preset mode.

12. The method of claim 11, wherein the present mode comprise at least one of:
one or more first settings representing a user's preferences for operating the air conditioner,
one or more second settings representing a speed of operation of the air conditioner,
one or more third setting representing a sleep mode of the air conditioner, or
one or more third setting representing an automatic operation mode of the air conditioner.

13. The method of claim 1, wherein the configuration information represents, for each of the plurality of surfaces, a respective action mode corresponding to that surface.

14. The method of claim 13, further comprising modifying the configuration information.

15. The method of claim 1, wherein the method further comprises at least one of:
waking up the controller based on a wake-up logic;
causing the controller to enter a sleep state based on a sleep logic;
modifying the preconfigured correspondences between set states and set control modes; and
performing a child lock function with respect to the controller, or
performing an anti-lost function with respect to the controller.

16. The method of claim 1, further comprising:
determining that the controller has been stationary for a preset duration, and
upon determining that the controller has been stationary for the preset duration:
generating one or more second control commands associated with the first action mode, and
causing the one or more second control commands to be transmitted to the target control device.

17. A storage medium having a plurality of instructions stored thereon, wherein the plurality of instructions, when executed by at least one processor, causes the at least one processor to perform operations comprising:
determining a current state of a controller for controlling an operation of a target control device, wherein the controller comprises a plurality of surfaces, and wherein determining the current state of the controller comprises determining that a first surface of the plurality of surfaces is facing upward;
determining, based on configuration information of the controller, that the first surface of the controller is associated with a first action mode of the controller;
generating one or more first control commands associated with the first action mode; and
causing the one or more first control commands to be transmitted to the target control device.

18. A controller comprising at least one processor and a memory, wherein the memory stores a plurality of instructions, and the controller is configured such that the plurality of instructions, when executed by the at least one processor, causes the at least one processor to perform operations comprising:
determining a current state of a controller for controlling an operation of a target control device, wherein the controller comprises a plurality of surfaces, and wherein determining the current state of the controller comprises determining that a first surface of the plurality of surfaces is facing upward;
determining, based on configuration information of the controller, that the first surface of the controller is associated with a first action mode of the controller;
generating one or more first control commands associated with the first action mode; and
causing the one or more first control commands to be transmitted to the target control device.

* * * * *